United States Patent
Yang et al.

(10) Patent No.: US 11,379,745 B2
(45) Date of Patent: Jul. 5, 2022

(54) METHOD, APPARATUS, DEVICE AND MACHINE-READABLE MEDIUM FOR DETECTING ABNORMAL DATA USING AN AUTOENCODER

(71) Applicant: Siemens Aktiengesellschaft, Munich (DE)

(72) Inventors: Yi Yang, Beijing (CN); Jing Ma, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 952 days.

(21) Appl. No.: 16/135,043

(22) Filed: Sep. 19, 2018

(65) Prior Publication Data

US 2019/0087738 A1 Mar. 21, 2019

(30) Foreign Application Priority Data

Sep. 20, 2017 (CN) .......................... 201710851825.8

(51) Int. Cl.
*G06N 5/04* (2006.01)
*G06K 9/62* (2022.01)
(Continued)

(52) U.S. Cl.
CPC ......... *G06N 5/047* (2013.01); *G05B 23/0221* (2013.01); *G05B 23/0235* (2013.01);
(Continued)

(58) Field of Classification Search
None
See application file for complete search history.

(56) References Cited

U.S. PATENT DOCUMENTS

2007/0244841 A1 10/2007 Vatchkov et al.
2016/0127405 A1 5/2016 Kasahara
(Continued)

FOREIGN PATENT DOCUMENTS

CN 101027617 A 8/2007
CN 106485353 A 3/2017
(Continued)

OTHER PUBLICATIONS

Chinese Office Action dated Dec. 18, 2020.
Extended European Search Report dated Feb. 15, 2019.

*Primary Examiner* — Alan Chen
(74) *Attorney, Agent, or Firm* — Harness, Dickey & Pierce, P.L.C.

(57) ABSTRACT

In an embodiment, a method includes: using at least two items of sequentially collected, mutually associated data to create at least two detection data sets, each including a first number of items of sequentially collected data in the at least two items of data; using an autoencoder to process the at least two detection data sets, to output result data sets respectively corresponding to the at least two detection data sets, the first number being equal to the number of neurons in an input layer of the autoencoder, and the autoencoder being trained using data having a regular pattern of variation identical to the at least two items of data; and determining, as abnormal data, data which does not have the regular pattern of variation in the at least two items of data, based upon the at least two detection data sets and the result data sets corresponding thereto.

12 Claims, 5 Drawing Sheets

(51) Int. Cl.
*G06F 17/18* (2006.01)
*G06N 3/04* (2006.01)
*G05B 23/02* (2006.01)

(52) U.S. Cl.
CPC ......... *G05B 23/0254* (2013.01); *G06F 17/18* (2013.01); *G06K 9/6215* (2013.01); *G06N 3/04* (2013.01)

(56) References Cited

U.S. PATENT DOCUMENTS

| | | | |
|---|---|---|---|
| 2016/0371316 A1* | 12/2016 | Okanohara | G06N 3/0445 |
| 2017/0132910 A1 | 5/2017 | Chen et al. | |
| 2017/0206464 A1* | 7/2017 | Clayton | G06N 3/0445 |
| 2018/0284737 A1* | 10/2018 | Cella | G05B 19/4185 |
| 2018/0365089 A1 | 12/2018 | Okanohara et al. | |
| 2019/0324444 A1* | 10/2019 | Cella | G06K 9/6262 |

FOREIGN PATENT DOCUMENTS

| | | | |
|---|---|---|---|
| CN | 106682685 A | 5/2017 | |
| CN | 106707099 A | 5/2017 | |
| CN | 107007279 A | 8/2017 | |
| EP | 3016033 A1 | 5/2016 | |
| WO | WO 2017094267 A1 | 6/2017 | |

* cited by examiner

METHOD, APPARATUS, DEVICE AND MACHINE-READABLE MEDIUM FOR DETECTING ABNORMAL DATA USING AN AUTOENCODER

PRIORITY STATEMENT

The present application hereby claims priority under 35 U.S.C. § 119 to Chinese patent application number CN 201710851825.8 filed Sep. 20, 2017, the entire contents of which are hereby incorporated herein by reference.

FIELD

Embodiments of the present invention generally relates to a method, apparatus and device for detecting abnormal data, and a machine-readable medium.

BACKGROUND

In general, it is necessary to sequentially collect many items of data from various monitored objects, such as production lines and machine tools, in order to detect an operating condition of the object; these items of collected data are associated with each other. The quality of collected data is generally influenced by many causes, such as sensor failure, communication link congestion and server storage faults. Abnormal data is one type of serious data quality problem. Abnormal data might be too small, too large, or very different from other data determined by a particular standard.

At the present time, many methods for detecting abnormal data have already appeared, e.g. a detection method based on the 3δ principle, a small-wave smoothing method and a speed constraint smoothing method, etc. However, these methods are not universal solutions for sequentially collected, mutually associated data, i.e. they cannot detect abnormal data in sequentially collected, mutually associated data of certain types. For example, a detection method based on the 3δ principle cannot detect abnormal data in data which does not satisfy a normal distribution, a small-wave smoothing method cannot detect abnormal data in a fierce vibration signal, and a speed constraint smoothing method cannot detect abnormal data in square-wave data, etc.

SUMMARY

Embodiments of the present invention provide a method, apparatus and device for detecting abnormal data, and a machine-readable medium, which are capable of detecting abnormal data in sequentially collected, mutually associated data of all types.

A method for detecting abnormal data according to an embodiment of the present invention, comprises: using at least two items of sequentially collected, mutually associated data to create at least two detection data sets, wherein each detection data set contains a first number of items of sequentially collected data in the at least two items of data; using an autoencoder to process the at least two detection data sets, to output result data sets respectively corresponding to the at least two detection data sets, wherein the first number is equal to the number of neurons in an input layer of the autoencoder, and the autoencoder is trained using training data having a regular pattern of variation identical to that of the at least two items of data; and determining, as abnormal data, data which does not have the regular pattern of variation in the at least two items of data, on the basis of the at least two detection data sets and the result data sets corresponding thereto. Here, on the basis of the difference between input data and output data of the autoencoder trained using sequentially collected, mutually associated sample data having a certain regular pattern of variation, abnormal data not having the regular pattern of variation in sequentially collected, mutually associated detected data having the regular pattern of variation can be found, and all types of sequentially collected, mutually associated data have their own respective regular patterns of variation; hence, the method for detecting abnormal data using the autoencoder in this embodiment can detect abnormal data in all types of sequentially collected, mutually associated data.

An apparatus for detecting abnormal data according to an embodiment of the present invention, comprises: a creating module, for using at least two items of sequentially collected, mutually associated data to create at least two detection data sets, wherein each detection data set contains a first number of items of sequentially collected data in the at least two items of data; a processing module, for using an autoencoder to process the at least two detection data sets, to output result data sets respectively corresponding to the at least two detection data sets, wherein the first number is equal to the number of neurons in an input layer of the autoencoder, and the autoencoder is trained using training data having a regular pattern of variation identical to that of the at least two items of data; and a determining module, for determining, as abnormal data, data which does not have the regular pattern of variation in the at least two items of data, on the basis of the at least two detection data sets and the result data sets corresponding thereto. Here, on the basis of the difference between input data and output data of the autoencoder trained using sequentially collected, mutually associated sample data having a certain regular pattern of variation, abnormal data not having the regular pattern of variation in sequentially collected, mutually associated detected data having the regular pattern of variation can be found, and all types of sequentially collected, mutually associated data have their own respective regular patterns of variation; hence, the method for detecting abnormal data using the autoencoder in this embodiment can detect abnormal data in all types of sequentially collected, mutually associated data.

A device for detecting abnormal data according to an embodiment of the present invention, comprises:
at least one processor; and
at least one memory, for storing an executable instruction which, when executed, causes the at least one processor to perform an embodiment of the method described above.

A non-transitory machine readable medium according to an embodiment of the present invention, on which is stored an executable instruction which, when executed, causes a processor to perform an embodiment of the method described above.

BRIEF DESCRIPTION OF THE DRAWINGS

Other features, characteristics, advantages and benefits of the present invention will become more obvious through the following detailed description which makes reference to the accompanying drawings.

| Reference characters of FIGURES: | |
|---|---|
| 100: method for training an autoencoder | 102: converting sample data to one-dimensional array |
| 104: normalizing the one-dimensional array | 106: creating multiple training data sets |
| 108: training the autoencoder | 200: method for detecting abnormal data |
| 202: converting data to one-dimensional array | 204: normalizing the one-dimensional array |
| 206: creating multiple detection data sets | 208: acquiring result data sets corresponding to detection data sets |
| 210: computing respective residual errors of data | 212: computing mean square deviation of residual errors |
| 214: computing threshold for determining abnormal data | 216: determining abnormal data in data |
| 300: method for detecting abnormal data | 302: creating detection data set |
| 304: obtaining result data set | 306: determining abnormal data |
| 400: apparatus for detecting abnormal data | 402: creating module |
| 404: processing module | 406: determining module |
| 500: device for detecting abnormal data | 502: processor |
| 504: memory | |

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

A method for detecting abnormal data according to an embodiment of the present invention, comprises: using at least two items of sequentially collected, mutually associated data to create at least two detection data sets, wherein each detection data set contains a first number of items of sequentially collected data in the at least two items of data; using an autoencoder to process the at least two detection data sets, to output result data sets respectively corresponding to the at least two detection data sets, wherein the first number is equal to the number of neurons in an input layer of the autoencoder, and the autoencoder is trained using training data having a regular pattern of variation identical to that of the at least two items of data; and determining, as abnormal data, data which does not have the regular pattern of variation in the at least two items of data, on the basis of the at least two detection data sets and the result data sets corresponding thereto. Here, on the basis of the difference between input data and output data of the autoencoder trained using sequentially collected, mutually associated sample data having a certain regular pattern of variation, abnormal data not having the regular pattern of variation in sequentially collected, mutually associated detected data having the regular pattern of variation can be found, and all types of sequentially collected, mutually associated data have their own respective regular patterns of variation; hence, the method for detecting abnormal data using the autoencoder in this embodiment can detect abnormal data in all types of sequentially collected, mutually associated data.

In one embodiment, the determining of, as abnormal data, data which does not have the regular pattern of variation in the at least two items of data, comprises: using a detection data set containing any item of data in the at least two items of data, and a result data set corresponding thereto, to compute a residual error of said any item of data, in order to obtain respective residual errors of the at least two items of data; and finding data with a residual error greater than a first threshold in the at least two items of data, as the abnormal data. Here, as the residual errors of the detected data are used to find abnormal data in the detected data, abnormal data in the detected data can be found conveniently and quickly.

In another embodiment, the determining of, as abnormal data, data which does not have the regular pattern of variation in the at least two items of data, further comprises: determining the first threshold on the basis of the respective residual errors of the at least two items of data. Here, as the threshold for determining abnormal data is determined on the basis of the residual errors of the detected data, the threshold for determining abnormal data can be determined easily.

In another embodiment, the creating of multiple detection data sets comprises: converting the multiple items of data to a one-dimensional array, wherein in the one-dimensional array, the multiple items of data are arranged sequentially from a head to a tail of the one-dimensional array according to a sequence of generation; sliding a sliding window of length equal to the designated number from the head of the one-dimensional array to the tail of the one-dimensional array, in such a way as to slide past one item of data each time; and using data covered by the sliding window after each sliding operation to form a detection data set, in order to obtain the multiple detection data sets. Here, the conversion of data to the one-dimensional array can facilitate storage and subsequent processing, and as the detection data sets are created by means of the sliding window, the detection data sets can be created easily.

An apparatus for detecting abnormal data according to an embodiment of the present invention, comprises: a creating module, for using at least two items of sequentially collected, mutually associated data to create at least two detection data sets, wherein each detection data set contains a first number of items of sequentially collected data in the at least two items of data; a processing module, for using an autoencoder to process the at least two detection data sets, to output result data sets respectively corresponding to the at least two detection data sets, wherein the first number is equal to the number of neurons in an input layer of the autoencoder, and the autoencoder is trained using training data having a regular pattern of variation identical to that of the at least two items of data; and a determining module, for determining, as abnormal data, data which does not have the regular pattern of variation in the at least two items of data, on the basis of the at least two detection data sets and the result data sets corresponding thereto. Here, on the basis of the difference between input data and output data of the autoencoder trained using sequentially collected, mutually associated sample data having a certain regular pattern of variation, abnormal data not having the regular pattern of variation in sequentially collected, mutually associated detected data having the regular pattern of variation can be found, and all types of sequentially collected, mutually associated data have their own respective regular patterns of variation; hence, the method for detecting abnormal data using the autoencoder in this embodiment can detect abnormal data in all types of sequentially collected, mutually associated data.

In one embodiment, the determining module comprises: a computing module, a computing module, for using a detection data set containing any item of data in the at least two items of data, and a result data set corresponding thereto, to compute a residual error of said any item of data, in order to obtain respective residual errors of the at least two items of data; and a searching module, for finding data with a residual error greater than a first threshold in the at least two items of data, as the abnormal data. Here, as the residual errors of the detected data are used to find abnormal data in the detected data, abnormal data in the detected data can be found conveniently and quickly.

In another embodiment, the determining module further comprises: a module for determining the first threshold on the basis of the respective residual errors of the at least two items of data. Here, as the threshold for determining abnormal data is determined on the basis of the residual errors of the detected data, the threshold for determining abnormal data can be determined easily.

In another embodiment, the creating module comprises: a converting module, for converting the multiple items of data to a one-dimensional array, wherein in the one-dimensional array, the multiple items of data are arranged sequentially from a head to a tail of the one-dimensional array according to a sequence of generation; a sliding module, for sliding a sliding window of length equal to the designated number from the head of the one-dimensional array to the tail of the one-dimensional array, in such a way as to slide past one item of data each time; and a forming module, for using data covered by the sliding window after each sliding operation to form a detection data set, in order to obtain the multiple detection data sets. Here, the conversion of data to the one-dimensional array can facilitate storage and subsequent processing, and as the detection data sets are created by means of the sliding window, the detection data sets can be created easily.

A device for detecting abnormal data according to an embodiment of the present invention, comprises: at least one processor; and at least one memory, for storing an executable instruction which, when executed, causes the at least one processor to perform an embodiment of the method described above.

A non-transitory machine readable medium according to an embodiment of the present invention, on which is stored an executable instruction which, when executed, causes a processor to perform an embodiment of the method described above.

An autoencoder is a neural network having an input layer, one or more hidden layers and an output layer, wherein the input layer and output layer of the autoencoder have the same number of neurons.

Since the input layer and output layer of the autoencoder have the same number of neurons, the autoencoder actually simulates an identity function which causes output data of the autoencoder to be equal to input data of the autoencoder.

Due to the characteristic of the autoencoder in simulating an identity function which causes output data of the autoencoder to be equal to input data of the autoencoder, after using a certain type of sequentially collected, mutually associated data having a certain regular pattern of variation to train the autoencoder, if data In of the certain type in question is normal data having the regular pattern of variation, then data On outputted by the autoencoder after processing the data In is very close to the data In, and correspondingly, the difference between the data On and the data In is relatively small; conversely, if data Ia of the certain type in question is abnormal data lacking the regular pattern of variation, then data Oa outputted by the autoencoder after processing the data Ia is not close to the data Ia, and correspondingly, the difference between the data Oa and the data Ia is relatively large. In other words, abnormal data can be found on the basis of the difference between input data and output data of the autoencoder.

Since all types of sequentially collected, mutually associated data have their own respective regular patterns of variation, for each type of sequentially collected, mutually associated data having a certain regular pattern of variation, abnormal data not having the regular pattern of variation in data of this type can be found on the basis of the difference between input data and output data of an autoencoder trained using data of this type.

The solutions in the various embodiments of the present invention use the abovementioned characteristic of the autoencoder to detect an abnormal data set in data, hence the solutions in the various embodiments of the present invention can detect abnormal data in all types of sequentially collected, mutually associated data.

Various embodiments of the present invention are described in detail below with reference to the accompanying drawings.

Figure 1:
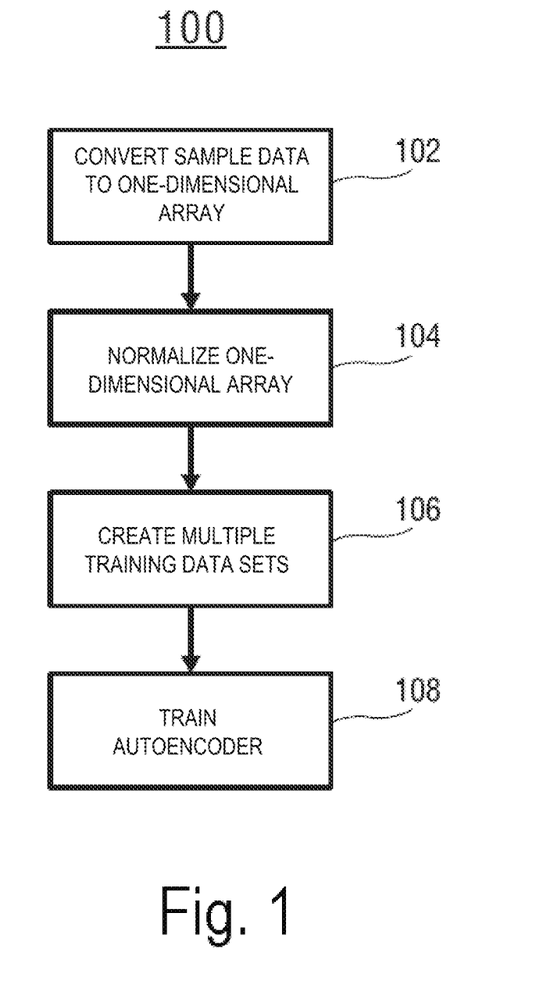
FIG. 1 shows a flow chart of a method for training an autoencoder according to one embodiment of the present invention.

Reference is now made to FIG. 1, which shows a flow chart of a method for training an autoencoder according to one embodiment of the present invention. The method 100 shown in FIG. 1 uses multiple items of sequentially collected, mutually associated sample data SM, of a type T and having a regular pattern of variation R, as training data to train an autoencoder AE, wherein the multiple items of sample data SM have normal data and abnormal data, and it is known which data in the multiple items of sample data SM are normal data and which data are abnormal data. Preferably, the number of neurons in a hidden layer of the autoencoder AE is not less than 3. The method 100 shown in FIG. 1 may be performed by a device having computation ability, such as a server, laptop or desktop computer.

As shown in FIG. 1, in box 102, the multiple items of sample data SM are converted to a one-dimensional array AR. In the one-dimensional array AR, the multiple items of sample data SM are arranged from a head of the one-dimensional array AR to a tail of the one-dimensional array AR according to a sequence of collection.

In box 104, the one-dimensional array AR is normalized, such that all data in the one-dimensional array AR are in the range of [0, 1]. For example, the normalization may be as follows: first of all, the largest item of data in the one-dimensional array AR is found; then each item of data in the one-dimensional array AR is divided by the largest item of data. As another example, the normalization may be as follows: first of all, the largest item of data and the smallest item of data in the one-dimensional array AR are found; then the difference Diff between the largest item of data and the smallest item of data is computed; then the smallest item of data is subtracted from each item of data in the one-dimensional array AR, to obtain a preliminarily processed one-dimensional array; finally, each item of data in the preliminarily processed one-dimensional array is divided by the difference Diff.

In box 106, multiple training data sets TRS are created. Specifically, a sliding window SLIW of length p1 is progressively slid from the head of the normalized one-dimensional array AR to the tail of the normalized one-dimensional array AR, in such a way as to slide past one item of data each time, and creating one training data set from the p1 items of data covered by the sliding window SLIW after each sliding operation, thereby creating the multiple training data sets TRS, wherein p1 is equal to the number of neurons in the input layer (or output layer) of the autoencoder AE. Clearly, each item of data in the multiple items of sample data SM is included in at least one training data set and in at most p1 training data sets.

In box 108, the autoencoder AE is trained. Specifically, the multiple training data sets TRS are inputted into the autoencoder AE, one training data set at a time, to train the autoencoder AE. When all of the multiple training data sets TRS have been inputted into the autoencoder AE and training is complete, each parameter in the input layer, hidden layer and output layer of the autoencoder AE have been determined, and a trained autoencoder AE is thereby obtained.

Figure 2:
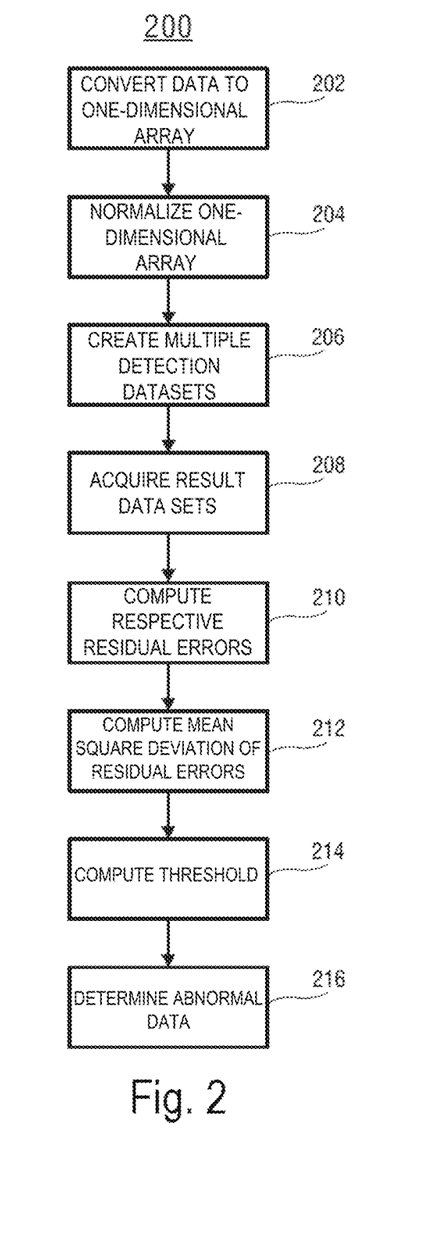
FIG. 2 shows an overall flow chart of a method for detecting abnormal data according to an embodiment of the present invention.

Reference is now made to FIG. 2, which shows an overall flow chart of a method for detecting abnormal data according to an embodiment of the present invention. The method 200 shown in FIG. 2 uses an autoencoder AE which has been trained by the method in FIG. 1, to detect abnormal data in multiple items of sequentially collected, mutually associated data TT of type T, wherein the multiple items of data TT and the multiple items of sample data SM used to train the autoencoder AE have the same regular pattern of variation R. The method 200 shown in FIG. 2 may be performed by a device having computation ability, such as a server, laptop or desktop computer.

As shown in FIG. 2, in box 202, the multiple items of data TT are converted to a one-dimensional array RY. In the one-dimensional array RY, the multiple items of data TT are arranged from a head of the one-dimensional array RY to a tail of the one-dimensional array RY according to a sequence of collection. Here, the conversion of the data TT to the one-dimensional array can facilitate storage and subsequent processing.

In box 204, the one-dimensional array RY is normalized, such that all data in the one-dimensional array RY are in the range of [0, 1]. Here, the normalization of the one-dimensional array RY can facilitate subsequent processing.

In box 206, multiple detection data sets DES are created. Specifically, the abovementioned sliding window SLIW of length p1 is progressively slid from the head of the normalized one-dimensional array RY to the tail of the normalized one-dimensional array RY, in such a way as to slide past one item of data each time, and one detection data set is created from the p1 items of data covered by the sliding window SLIW after each sliding operation, thereby creating the multiple detection data sets DES. As mentioned above, p1 is equal to the number of neurons in the input layer (or output layer) of the autoencoder AE. Clearly, each item of data in the multiple items of data TT is included in at least one training data set and in at most p1 training data sets. Here, as the detection data sets are created by means of the sliding window, the detection data sets can be created easily.

In box 208, result data sets corresponding to the detection data sets DES are acquired. Specifically, the trained autoencoder AE is used to process the multiple detection data sets DES one by one, to obtain result data sets respectively corresponding to the multiple detection data sets DES and outputted by the autoencoder AE. Due to the characteristic that the input layer and output layer of the autoencoder AE have the same number of neurons, each detection data set and the result data set corresponding thereto have the same number p1 of data.

In box 210, respective residual errors of the multiple items of data TT are computed. Specifically, for any item of data TT(i) in the multiple items of data TT, a detection data set or sets containing the item of data TT (i) is/are found amongst the multiple detection data sets DES, and a mean square deviation of the detection data set (s) found and the result data set (s) corresponding thereto is computed as a residual error of the item of data TT(i), so as to obtain the respective residual errors of the multiple items of data TT. For example, supposing that the detection data sets containing the item of data TT(i) are DESj, DESn and DESp, and the result data sets respectively corresponding to the detection data sets DESj, DESn and DESp are RESLj, RESLn and RESLp, then the residual error of the item of data TT(i) is equal to:

$$\frac{1}{3}\sqrt{(RESLj - DESj)^2 + (RESLn - DESn)^2 + (RESLp - DESp)^2}.$$

In box 212, a mean square deviation of the residual errors is computed, i.e. a mean square deviation A of the residual errors of the multiple items of data TT is computed.

In box 214, a threshold TH for determining abnormal data is computed. Specifically, the threshold TH is computed as three times the mean square deviation A.

In box 216, abnormal data in the multiple items of data TT is determined. Specifically, the respective residual errors of the multiple items of data TT are individually compared with the threshold TH. If it is found by comparison that the residual error of one or more item of data in the multiple items of data TT is greater than the threshold TH, then it is determined that the one or more item of data is abnormal data. The abnormal data determined is data which does not have the regular pattern of variation R in the multiple items of data TT.

Other Variants

Those skilled in the art will understand that although the data TT is converted to the one-dimensional array to facilitate storage and subsequent processing in the embodiment above, the present invention is not limited to this. In other embodiments of the present invention, data TT need not be converted to a one-dimensional array.

Those skilled in the art will understand that although the one-dimensional array RY is normalized in the embodiment above, the present invention is not limited to this. In other embodiments of the present invention, the one-dimensional array RY need not be normalized.

Those skilled in the art will understand that although the sliding window is used to create the detection data sets in the embodiment above, the present invention is not limited to this. In other embodiments of the present invention, detection data sets may be created in another manner from data to be detected.

Those skilled in the art will understand that although the threshold for determining abnormal data is three times the mean square deviation of the residual errors of the detected data in the embodiment above, the present invention is not limited to this. In other embodiments of the present invention, the threshold for determining abnormal data may be determined in another manner on the basis of the residual errors of the detected data. Here, as the threshold for determining abnormal data is determined on the basis of the residual errors of the detected data, the threshold for determining abnormal data can be determined easily.

Figure 3:
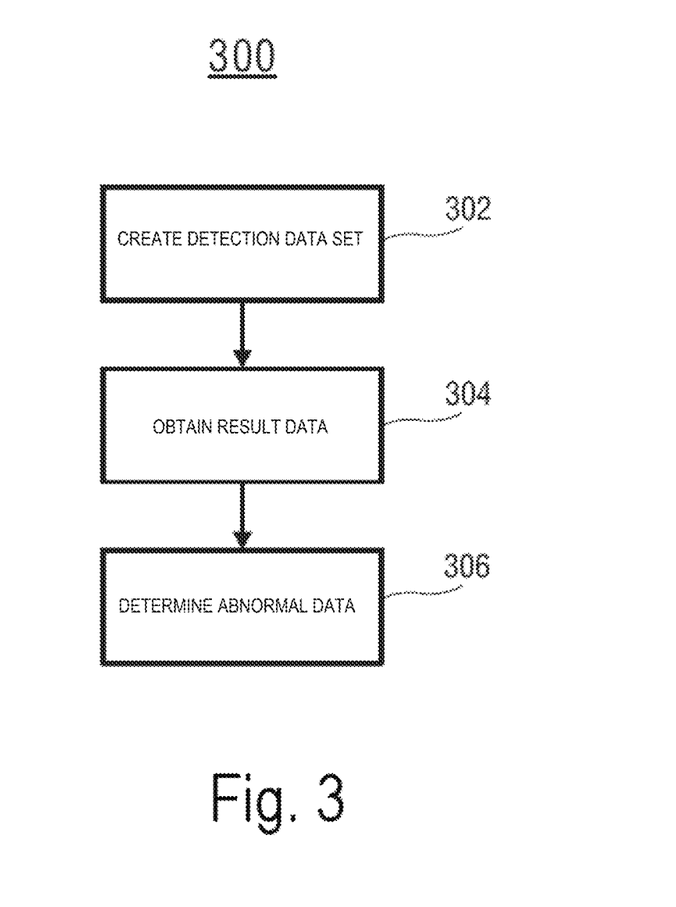
FIG. 3 shows a flow chart of a method for detecting abnormal data according to an embodiment of the present invention.

Reference is now made to FIG. 3, which shows a flow chart of a method for detecting abnormal data according to an embodiment of the present invention. The method 300 shown in FIG. 3 may be performed by a device having computation ability, such as a server, laptop or desktop computer.

As shown in FIG. 3, the method 300 may comprise, in box 302, creating detection data sets, i.e. using at least two items of sequentially collected, mutually associated data to create at least two detection data sets, wherein each detection data set contains a first number of items of sequentially collected data in the at least two items of data. For example but without limitation, a sliding window may be used to create the detection data sets, as shown in box 206 in the method 200.

The method 300 may further comprise, in box 304, obtaining result data sets, i.e. using an autoencoder to process the at least two detection data sets, to output result data sets respectively corresponding to the at least two detection data sets, wherein the first number is equal to the number of neurons in the input layer of the autoencoder, and the autoencoder is trained using training data having a regular pattern of variation identical to that of the at least two items of data.

The method 300 may further comprise, in box 306, determining abnormal data, i.e. determining, as abnormal data, data which does not have the regular pattern of variation in the at least two items of data, on the basis of the at least two detection data sets and the result data sets corresponding thereto.

Here, on the basis of the difference between input data and output data of the autoencoder trained using sequentially collected, mutually associated sample data having a certain regular pattern of variation, abnormal data not having the regular pattern of variation in sequentially collected, mutually associated detected data having the regular pattern of variation can be found, and all types of sequentially collected, mutually associated data have their own respective regular patterns of variation; hence, the method for detecting abnormal data using the autoencoder in this embodiment can detect abnormal data in all types of sequentially collected, mutually associated data.

In one embodiment, box 306 comprises: using a detection data set containing any item of data in the at least two items of data, and a result data set corresponding thereto, to compute a residual error of said any item of data, in order to obtain respective residual errors of the at least two items of data; and finding data with a residual error greater than a first threshold in the at least two items of data, as the abnormal data. Here, as the residual errors of the detected data are used to find abnormal data in the detected data, abnormal data in the detected data can be found conveniently and quickly.

In another embodiment, box 306 further comprises: determining the first threshold on the basis of the respective residual errors of the at least two items of data. Here, as the threshold for determining abnormal data is determined on the basis of the residual errors of the detected data, the threshold for determining abnormal data can be determined easily.

In another embodiment, box 302 comprises: converting the multiple items of data to a one-dimensional array, wherein in the one-dimensional array, the multiple items of data are arranged sequentially from a head to a tail of the one-dimensional array according to a sequence of generation; sliding a sliding window of length equal to the designated number from the head of the one-dimensional array to the tail of the one-dimensional array, in such a way as to slide past one item of data each time; and using data covered by the sliding window after each sliding operation to form a detection data set, in order to obtain the multiple detection data sets. Here, the conversion of data to the one-dimensional array can facilitate storage and subsequent processing, and as the detection data sets are created by means of the sliding window, the detection data sets can be created easily.

Figure 4:
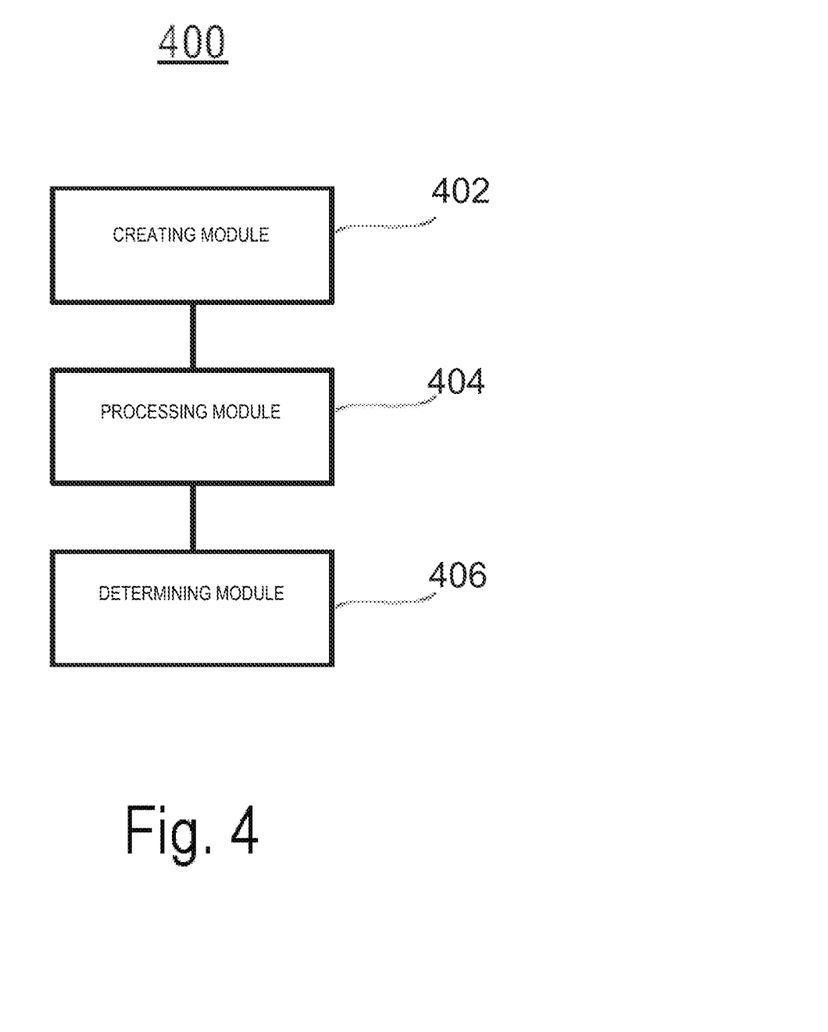
FIG. 4 shows a schematic diagram of an apparatus for detecting abnormal data according to an embodiment of the present invention.

Reference is now made to FIG. 4, which shows a schematic diagram of an apparatus for detecting abnormal data according to an embodiment of the present invention. The apparatus 400 shown in FIG. 4 may be implemented using software, hardware, or a combination of software and hardware.

As shown in FIG. 4, the apparatus 400 may comprise a creating module 402, a processing module 404 and a determining module 406. The creating module 402 is used for using at least two items of sequentially collected, mutually associated data to create at least two detection data sets, wherein each detection data set contains a first number of items of sequentially collected data in the at least two items of data. For example but without limitation, a sliding window may be used to create the detection data sets. The processing module 404 is used for using an autoencoder to process the at least two detection data sets, to output result data sets respectively corresponding to the at least two detection data sets, wherein the first number is equal to the number of neurons in the input layer of the autoencoder, and the autoencoder is trained using training data having a regular pattern of variation identical to that of the at least two items of data. The determining module 406 is used for determining, as abnormal data, data which does not have the regular pattern of variation in the at least two items of data, on the basis of the at least two detection data sets and the result data sets corresponding thereto. Here, on the basis of the difference between input data and output data of the autoencoder trained using sequentially collected, mutually associated sample data having a certain regular pattern of variation, abnormal data not having the regular pattern of variation in sequentially collected, mutually associated detected data having the regular pattern of variation can be found, and all types of sequentially collected, mutually associated data have their own respective regular patterns of variation; hence, the method for detecting abnormal data using the autoencoder in this embodiment can detect abnormal data in all types of sequentially collected, mutually associated data.

In one embodiment, the determining module 406 comprises: a computing module, for using a detection data set containing any item of data in the at least two items of data, and a result data set corresponding thereto, to compute a residual error of said any item of data, in order to obtain respective residual errors of the at least two items of data; and a searching module, for finding data with a residual error greater than a first threshold in the at least two items of data, as the abnormal data. Here, as the residual errors of the detected data are used to find abnormal data in the detected data, abnormal data in the detected data can be found conveniently and quickly.

In another embodiment, the determining module 406 further comprises: a module for determining the first threshold on the basis of the respective residual errors of the at least two items of data. Here, as the threshold for determining abnormal data is determined on the basis of the residual errors of the detected data, the threshold for determining abnormal data can be determined easily.

In another embodiment, the creating module 402 may comprise: a converting module, for converting the multiple items of data to a one-dimensional array, wherein in the one-dimensional array, the multiple items of data are arranged sequentially from a head to a tail of the one-dimensional array according to a sequence of generation; a sliding module, for sliding a sliding window of length equal to the designated number from the head of the one-dimensional array to the tail of the one-dimensional array, in such a way as to slide past one item of data each time; and a forming module, for using data covered by the sliding window after each sliding operation to form a detection data set, in order to obtain the multiple detection data sets. Here, the conversion of data to the one-dimensional array can facilitate storage and subsequent processing, and as the detection data sets are created by means of the sliding window, the detection data sets can be created easily.

Figure 5:
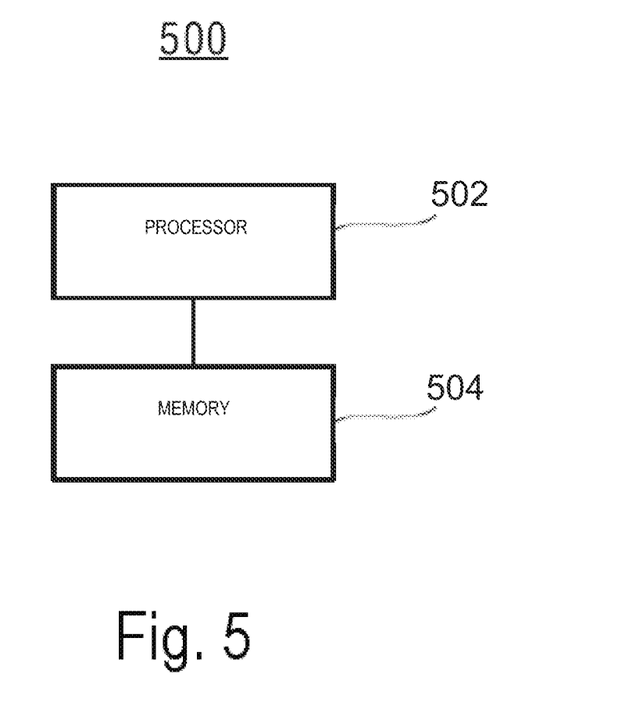
FIG. 5 shows a schematic diagram of a device for detecting abnormal data according to an embodiment of the present invention.

Reference is now made to FIG. 5, which shows a schematic diagram of a device for detecting abnormal data according to an embodiment of the present invention. As shown in FIG. 5, the device 500 may comprise at least one processor 502 and at least one memory 504. The at least one memory 504 is used for storing an executable instruction which, when executed, causes the at least one processor 502 to execute an operation included in the method 100, 200 or 300.

The embodiments of the present invention further provide a machine-readable medium, on which is stored an executable instruction; this readable instruction, when executed by a processor, causes the processor to perform any one of the methods described above. Specifically, a system or apparatus equipped with a machine-readable medium may be provided; software program code realizing a function of any one of the embodiments above is stored on the machine-readable medium, and a computer or processor of the system or apparatus is caused to read and execute a machine-readable instruction stored in the machine-readable medium.

In such a situation, program code read from the machine-readable medium can itself realize a function of any one of the embodiments above, hence machine-readable code and the machine-readable medium storing the machine-readable code form part of the present invention.

Examples of machine-readable media include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROM. Optionally, program code may be downloaded from a server computer or a cloud via a communication network.

It must be explained that not all of the steps and modules in the flows and system structure diagrams above are necessary; certain steps or modules may be omitted according to actual requirements. The order in which steps are executed is not fixed, but may be adjusted as required. The system structures described in the embodiments above may be physical structures, and may also be logical structures, i.e. some modules might be realized by the same physical entity, or some modules might be realized by multiple physical entities, or realized jointly by certain components in multiple independent devices.

In the embodiments above, a hardware unit may be realized in a mechanical or an electrical manner. For example, a hardware unit may comprise a permanent dedicated circuit or logic (e.g. a special processor, FPGA or ASIC) to complete a corresponding operation. A hardware unit may also comprise programmable logic or circuitry (e.g. a universal processor or another programmable processor), and may be set temporarily by software to complete a corresponding operation. Particular embodiments (mechanical, or dedicated permanent circuitry, or temporarily set circuitry) may be determined on the basis of considerations of cost and time.

The present invention has been displayed and explained in detail above by means of the accompanying drawings and preferred embodiments, but the present invention is not limited to these disclosed embodiments. Based on the embodiments described above, those skilled in the art will know that further embodiments of the present invention, also falling within the scope of protection of the present invention, could be obtained by combining code checking means in different embodiments above.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112 (f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for detecting abnormal data, the method comprising:
   using at least two items of data to create at least two detection data sets, wherein
      the at least two items of data are sequentially collected and mutually associated, and
      each detection data set, of the at least two detection data sets, includes a first number of items of sequentially collected data in the at least two items of data;
   using an autoencoder to process the at least two detection data sets, and to output result data sets respectively corresponding to each of the at least two detection data sets, the first number of items being equal to a number of neurons in an input layer of the autoencoder, and the autoencoder being trained using training data having a regular pattern of variation identical to that of the at least two items of data; and
   determining, as the abnormal data, data which does not have the regular pattern of variation in the at least two items of data, based upon the at least two detection data sets and the result data. sets corresponding thereto, the determining including,
      using a detection data set containing an item of data in the at least two items of data, and a result data set corresponding to the detection data set, to compute a residual error of the item of data, to obtain respective residual errors of the at least two items of data, and
      identifying, as the abnormal data, data with a residual error greater than a first threshold in the at least two items of data.

2. The method of claim 1, wherein the determining further comprises:
   determining the first threshold based upon the respective residual errors of the at least two items of data.

3. The method of claim 2, wherein the using at least two items of data to create at least two detection data sets comprises:
   converting the at least two items of data to a one-dimensional array, wherein
      in the one-dimensional array, the at least two items of data are arranged sequentially from a head to a tail of the one-dimensional array according to a sequence of generation;
   sliding a sliding window from the head of the one-dimensional array to the tail of the one-dimensional array, so as to slide past one item of data each time, the sliding window having a length equal to the first number; and
   forming the at least two detection data sets using data covered by the sliding window after each sliding operation.

4. A device for detecting abnormal data, comprising:
   at least one processor; and
   at least one memory, storing an executable instruction which, when executed, causes the at least one processor to perform the method of claim 2.

5. A non-transitory machine readable medium, storing an executable instruction which, when executed, causes a processor to perform the method of claim 2.

6. The method of claim 1, wherein the using at least two items of data to create at least two detection data sets comprises:
   converting the at least two items of data to a one-dimensional array, wherein
      in the one-dimensional array, the at least two items of data are arranged sequentially from a head to a tail of the one-dimensional array according to a sequence of generation;
   sliding a sliding window from the head of the one-dimensional array to the tail of the one-dimensional array, so as to slide past one item of data each time, the sliding window having a length equal to the first number; and
   forming the at least two detection data sets using data covered by the sliding window after each sliding operation.

7. A non--transitory machine readable medium, storing an executable instruction which, when executed, causes a processor to perform the method of claim 1.

8. An apparatus for detecting abnormal data, the apparatus comprising:

a creating module configured to use at least two items of data to create at least two detection data sets, wherein the at least two items of data are sequentially collected and mutually associated, and
 each detection data set of the at least two detection data sets includes a first number of items of sequentially collected data in the at least two items of data;
a processing module configured to use an autoencoder to process the at least two detection data sets, and to output result data sets respectively corresponding to the at least two detection data sets, wherein
 the first number is equal to a number of neurons in an input layer of the autoencoder, and
 autoencoder is trained using training data having a regular pattern of variation identical to that of the at least two items of data; and
a determining module configured to determine, as the abnormal data, data not having the regular pattern of variation in the at least two items of data, based upon the at least two detection data sets and the result data sets corresponding thereto, the determining module including,
 a computing module configured to use a detection data set containing an item of data in the at least two items of data, and a result data set corresponding to the detection data set, to compute a residual error of the item of data, to obtain respective residual errors of the at least two items of data, and
 a searching module configured to identify, as the abnormal data, data with a residual error greater than a first threshold in the at least two items of data.

9. The apparatus of in claim 8, wherein the determining module further comprises:
 a module configured to determine the first threshold based upon the respective residual errors of the at least two items of data.

10. The apparatus of claim 9, wherein the creating module comprises:
 a converting module configured to convert the at least two items of data to a one-dimensional array, wherein
  in the one-dimensional array, the at least two items of data are arranged sequentially from a head to a tail of the one-dimensional array according to a sequence of generation;
 a sliding module configured to slide a sliding window from the head of the one-dimensional array to the tail of the one-dimensional array, so as to slide past one item of data each time, the sliding window having a length equal to the first number; and
 a forming module configured to form the at least two detection data sets using data covered by the sliding window after each sliding operation.

11. The apparatus of claim 8, wherein the creating module comprises:
 a converting module configured to convert the at least two items of data to a one-dimensional array, wherein
  in the one-dimensional array, the at least two items of data are arranged sequentially from a head to a tail of the one-dimensional array according to a sequence of generation;
 a sliding module configured to slide a sliding window from the head of the one-dimensional array to the tail of the one-dimensional array, so as to slide past one item of data each time, the sliding window having a length equal to the first number; and
 a forming module configured to form the at least two detection data sets using data covered by the sliding window after each sliding operation.

12. A device for detecting abnormal data, the device comprising:
 at least one processor; and
 at least one memory, storing an executable instruction which, when executed, causes the at least one processor to,
  create at least two detection data sets, the at least two detection data sets being created using at least two items of data, the at least two items of data being sequentially collected and mutually associated, and each detection data set of the at least two detection data sets including a first number of items of sequentially collected data in the at least two items of data,
  process, using an autoencoder, the at least two detection data sets to generate result data sets respectively corresponding to the at least two detection data sets, the first number being equal to a number of neurons in an input layer of the autoencoder, and the autoencoder being trained using training data having a regular pattern of variation identical to the at least two items of data; and
  determine, as the abnormal data, data not having the regular pattern of variation in the at least two items of data, based upon the at least two detection data sets,
 wherein the executable instruction, when executed, causes the at least one processor to determine the data as the abnormal data by
  computing, using a detection data set containing an item of data in the at least two items of data, and a result data set corresponding to the detection data set, a residual error of the item of data, to obtain a respective residual error of the at least two items of data, and
  identifying, as the abnormal data, data with a residual error greater than a first threshold in the at least two items of data.

* * * * *